Sept. 9, 1969  T. B. CARD  3,465,967

FLEXIBLE HOT GAS VALVE

Filed Jan. 18, 1967

INVENTOR.
THEODORE B. CARD

BY Thomas W. Brennan

AGENT

United States Patent Office 3,465,967
Patented Sept. 9, 1969

3,465,967
FLEXIBLE HOT GAS VALVE
Theodore B. Card, Brigham City, Utah, assignor to Thiokol Chemical Corporation, Bristol, Pa., a corporation of Delaware
Filed Jan. 18, 1967, Ser. No. 610,125
Int. Cl. B64c 15/02
U.S. Cl. 239—265.23                                16 Claims

ABSTRACT OF THE DISCLOSURE

A valve for controlling the flow of hot gas from a rocket motor combustion chamber through a laterally directed opening in the exit cone of a rocket nozzle for thrust vector control of the propulsive gases passing through the nozzle, the valve including a flexible conduit of heat resistant material and having an inner lining of tungsten wire and an inlet member of a material which provides for cooling the hot gas by transpiration or ablation, deformation of the conduit by a pressurizable fluid serving to control gas flow through the conduit, and circulation of the fluid providing additional cooling.

---

The present invention relates to a hot gas valve and more particularly to a hot gas valve adapted to operate in the hot gas environment of a rocket motor combustion chamber for the purpose of controlling the flow of hot gases bled through a laterally directed orifice in the exit cone of a rocket motor nozzle for thrust vector control of the propulsive gases passing therethrough.

It has been recognized that a rocket could be effectively steered by bleeding and diverting some of the propulsive gases of the rocket through a laterally directed orifice or port so that they impinge upon the main stream of the propulsive gases passing through the exit cone of a rocket nozzle substantially perpendicular to the longitudinal axis thereof. With the advent of hot gas secondary injection as a means for achieving thrust vector control the development of a simple hot gas valve capable of withstanding the severe environment of rocket motor combustion chamber gas flow has become increasingly important. However, valve devices heretofore proposed for controlling the diverted gases did not prove succesful for the reasons that the high temperature and erosive nature of the propulsive gases quickly destroyed the valves and rendered the thrust vector control system inoperative.

The present invention overcomes the problems and disadvantages of the proposed devices by providing a valve device employing flexible means which are hydraulically pressurized to effect control of the hot gases and having parts adapted for cooling by ablation and/or transpiration. Additionally, the pressurizing fluid can be made to aid in cooling the valve device.

It is, therefore, an object of the present invention to provide a hot gas device which will effectively control the flow of hot propulsive gases.

Another object is the provision of a valve device which can withstand the destructive effects of the hot gases of a rocket motor.

A further object is to provide a hot gas valve capable of operating within a rocket motor combustion chamber and effectively controlling the flow of hot gases therefrom through an orifice in the exit cone of a rocket nozzle.

A still further object is the provision of a hot gas valve device capable of being operated in an on-off manner or as a modulating valve.

Other objects and advantages of the present invention will become more fully apparent from consideration of the following detailed description relating to the accompanying drawings wherein.

Figure 1:
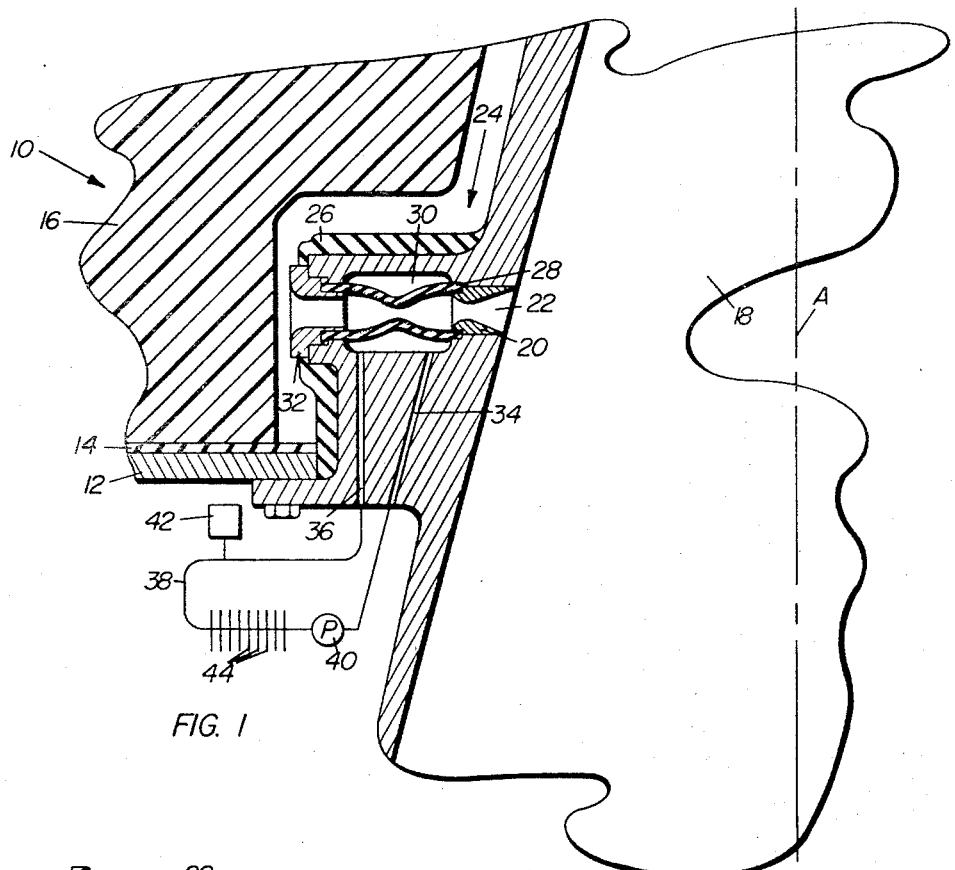
FIGURE 1 is a fragmentary sectional view, partly schematic, illustrating the relationship of the valve device of this invention to a rocket motor and the nozzle thereof.

Referring now to the drawings, wherein like reference characters designate like or corresponding parts throughout the several views, there is shown in FIGURE 1 a fragmentary sectional view of a rocket motor designated generally by reference numeral 10. Rocket motor 10 comprises a casing 12 suitably lined with thermal insulation 14 and containing motor propellant 16, a nozzle 18 provided with an insert 20 having a laterally directed injection orifice or port 22 and a valve device 24 for controlling the flow of hot gases from the casing through the orifice. As will be appreciated, nozzle 18 is disposed with the major portion thereof within casing 12 to provide an internal or submerged nozzle, orifice 22 being positioned so that the secondary hot gas injection therethrough is directed into the exit cone of the nozzle 18 substantially perpendicular to the longitudinal axis A of the nozzle.

Valve device 24 is provided with suitable thermal insulation 26 and comprises a premolded flexible tube or conduit 28 extending through a hydraulic chamber 30, one end of the conduit being in sealed relation to the insert 20 and the adjacent end wall of the chamber, the other end of the conduit being in sealed relation to an inlet member 32 and the end wall of the chamber adjacent thereto. Communicating with the chamber 30 is a pair of passageways 34 and 36 interconnected by a conduit or duct 38 external of the casing 12 and including a circulating pump 40, all together forming a closed loop adapted to be filled with a suitable hydraulic fluid. Suitably connected to duct 38 is a pressurization device 42 adapted to pressurize the hydraulic fluid for the purpose of applying pressure to flexible conduit 28 to flex the same and control the flow of gas therethrough.

To provide for cooling of the hot gas entering the conduit 28, inlet member 32 can be made of a sacrificial ablative material. Alternatively, member 32 can made of a porous material which is impregnated with a vaporizable material, for example, porous tungsten impregnated with copper, to provide for transpiration cooling of the hot gas.

Although not shown, passageways 34 and 36 can be made to communicate with chamber 30 in a tangential relationship and baffles can be provided within the chamber to induce increased circulation around conduit 28 to effect cooling as well as pressurization of the same. Additionally, duct 38 can be provided with a plurality of cooling fins 44.

Figure 2A:
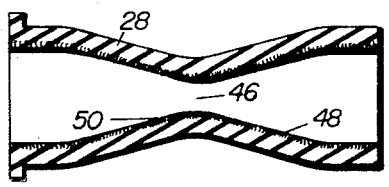
FIGURES 2a, 2b and 2c are sectional views, on a larger scale, of the flexible tube or conduit of the valve device of FIGURE 1 showing different pressurized conditions of the tube or conduit.

The tube or conduit 28 is constructed of a suitable flexible, heat-resistant material, for example, asbestos or nylon fibers in a suitable binder, such as ethylene-propylene rubber or a silicone polymer, or the like, and, as seen in FIGURE 2a, is molded with a throat portion 46 which is of considerably less cross-sectional area than that of the rest of the tube. The interior of the tube can be reinforced with a lining 48 resistant to heat and erosion, which reinforcement can take the form of wires imbedded in the material of the tube and made of tungsten or of porous tungsten impregnated with copper, or other suitable material, the wires being placed closer together in the area of the throat portion 46 to provide a lining portion 50 of greater density and hence providing greater resistance to the erosive effects of the products of combustion and of ablative or transpiration cooling.

Figure 2B:
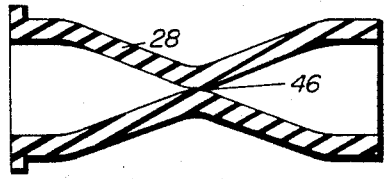
Figure 2C:
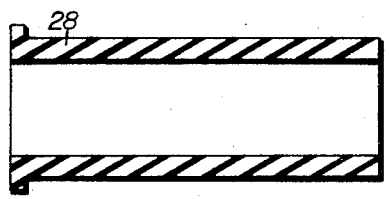

FIGURES 2b and 2c show the tube of FIGURE 2a (but with the interior lining thereof omitted) in different conditions of fluid pressurization, FIGURE 2b showing a condition in which the pressure of the hydraulic fluid in chamber 30 is relatively high and more than sufficient to overcome the pressure of the gas in the tube with the result that the flow of gas through the tube is cut off and the valve is closed. If desired, the tube 28 can be molded to the shape shown in FIGURE 2b, relaxation of the hydraulic pressure, together with the flow of gas through the tube, causing the tube to assume the configuration shown in FIGURE 2a in which the flow of gas through the tube is metered. FIGURE 2c shows a condition in which the hydraulic pressure is low or negligible, the force of the gas flow causing the tube to expand to the configuration shown, in which condition the valve is wide open. Obviously, by suitably pressurizing the hydraulic fluid relative to the force of the hot gas and related products, the flexible tube can be made to assume any desired configuration from closed to wide open in order that the gas flow can be metered as necessary for desired thrust vector control.

Figure 3:
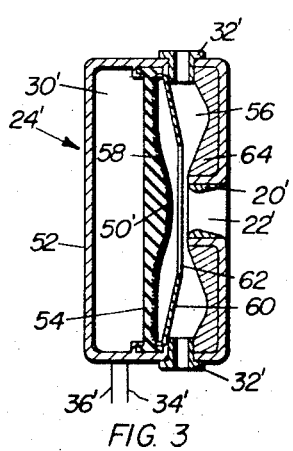
FIGURE 3 is a schematic illustrating a modification or alternate design of the valve device.

In FIGURE 3 there is schematically shown a valve device 24' which is a modification or alternate design of the valve device 24 and comprises a casing 52 having a diaphragm 54 secured in sealed relation inside the casing and dividing it into an hydraulic chamber 30' and a hot gas chamber 56, the latter having an insert 20' associated therewith which defines an injection orifice or port 22'. Diaphragm 54 is made of a suitable flexible, heat-resistant material, for example, the type of material used in the construction of the flexible tube or conduit 28, and is formed with a convex thickened portion 58 located in facing relation to the port 22' and is adapted to be flexed to close off the port. The diaphragm 54 is provided with wire reinforcement 50' similar to the inner lining of tube 28 for protection against the destructive effects of the hot gas and related products, the wires being very dense in the portion 58 of the diaphragm. Alternatively, the diaphragm 54 can be of uniform thickness, the additional thickness at portion 58 being in the form of a convex disk of tungsten or the like suitably secured to the diaphragm.

Hot gas enters chamber 56 through a plurality of inlet members 32' which can vary in number, although only two are shown, and are spaced around the casing 52 as necessary. Members 32' are similar in purpose and function to inlet member 32 of the valve device 24 of FIGURE 1 and serve to cool the hot gas by ablation or transpiration. The hot gas issuing from members 32' is deflected from direct impingement upon the diaphragm 54 by a baffle 60 of heat-resistant material, for example, tungsten or the like, which can take the form of a dished disk with a central aperture 62. The deflected gas is further cooled by ablation or transpiration through the medium of a body of suitable material 64.

As hereinbefore indicated, port 22' is closed off by flexing diaphragm 54, such flexure being brought about by the admission of hydraulic fluid into chamber 30' via conduits 34' and 36' which are the counterparts of items 34 and 36 and are substantially similarly related to items which are the counterparts of items 30, 38, 40, 42 and 44 of FIGURE 1 for suitable pressurization and circulation of the fluid and cooling of the diaphragm. Obviously, the hydraulic pressure can be controlled to provide for metered flow of the gas or have the valve device operate wide open.

While only one valve device has been shown and described as related to a rocket nozzle, it is to be understood that a plurality of such devices would be provided and located around the exit cone of the nozzle so as to effect steering in any desired direction.

The operation of the valve devices should be apparent from the foregoing description. However, briefly and in summary, ordinarily propulsive gases are developed in the rocket the appropriate valve device or devices are opconditions. When it is desired to effect steering of the rocket the appropriate valve device or devices are operated to reduce hydraulic pressure and allow hot gases to flow through the orifice or orifices and impinge upon the main stream of propulsive gases passing through the exit cone of the rocket nozzle for thrust vector control of the rocket. After the desired amount of thrust vectoring, the valve devices would be flexed to closed conditions.

It will be appreciated that the various parameters will be governed by the severity of the hot gas environment and the duration of time the valve devices are required to be operative.

Obviously, many modifications and variations of the present invention are possible in light of the above teachings. It is therefore to be understood that within the scope of the appended claims the invention can be practiced otherwise than as specifically described.

What is claimed is:

1. In a rocket thrust vector control system the combination comprising:
   a rocket nozzle having the major portion thereof disposed within a rocket motor casing, said nozzle having a laterally directed orifice extending through the side thereof communicating the interiors of said casing and nozzle;
   a hot gas valve device disposed within said casing and having a flexible tubular conduit for controlling the flow of hot gases through said orifice, said conduit having an innerlining of metallic reinforcement; and
   means for flexing said flexible member.

2. The combination of claim 1 wherein:
   said last mentioned means comprises:
      hydraulic means adapted to be pressurized for flexing said flexible conduit and to be circulated for cooling said flexible conduit.

3. The combination of claim 1 wherein:
   said reinforcement comprises wires of tungsten.

4. The combination of claim 1 wherein:
   said conduit is formed with a throat portion of lesser cross-sectional area than that of the rest of the conduit.

5. The combination of claim 4 wherein:
   said conduit has an inner lining of metallic reinforcement.

6. The combination of claim 5 wherein:
   said reinforcement comprises wires of tungsten, and said wires are located closer together at said throat portion for greater reinforcement thereof.

7. The combination of claim 1 wherein:
   said flexible member is a disk having a face adjacent said orifice, said face of the disk having metallic reinforcement.

8. The combination of claim 7 wherein:
   said reinforcement varies in extent and is thicker at the portion of the disk closest to said orifice.

9. The combination of claim 8 wherein:
   said reinforcement comprises tungsten.

10. The combination of claim 1 wherein:
    said hot gas valve device further comprises an inlet member through which the hot gas passes, said member being of a material which serves to cool the hot gas passing therethrough.

11. The combination of claim 10 wherein:
    the material of said inlet member is ablative.

12. The combination of claim 10 wherein:
    the material of said inlet member comprises a porous substance having a relatively high melting point, said porous substance being impregnated with a coolant substance having a relatively lower melting point, said coolant substance upon exposure to said hot gas liquifying and vaporizing for taking up heat and cooling the hot gas.

13. The combination of claim 1 wherein:
said last-mentioned means comprises an hydraulic chamber;
passageways communicating with and tangentially related to said hydraulic chamber;
a duct exterior of said nozzle and casting, said duct containing a circulating pump and forming with said passageways and hydraulic chamber a closed loop adapted to be filled with hydraulic fluid; and
means connected to said duct for pressurizing said hydraulic fluid;
whereby pressurization of the hydraulic fluid serves to flex said flexible member and circulation of the hydraulic fluid assists in cooling said member.

14. The combination of claim 13 wherein:
said flexible member is a conduit extending through said hydraulic chamber and in communication with said orifice; and
an inlet member of sacrificial material receiving the hot gas and passing it to said flexible member.

15. The combination of claim 13 wherein:
said flexible member is a disk on one side of said hydraulic chamber and forming an end wall thereof, said disk having a portion in facing relation to said orifice and adapted to be flexed by the hydraulic fluid for closing off flow of hot gas through the orifice;
inlet means of sacrificial material receiving the hot gas and directing it to the orifice; and
deflecting means associated with said disk for deflecting the hot gas directed to the orifice.

16. The combination of claim 15 wherein:
said disk portion is provided with metallic reinforcement.

References Cited

UNITED STATES PATENTS

| | | | |
|---|---|---|---|
| 2,622,620 | 12/1952 | Annin | 251—5 |
| 2,735,642 | 2/1956 | Norman | 251—5 |
| 3,036,430 | 5/1962 | Eggers et al. | 239—265.23 |
| 3,128,602 | 4/1964 | Salemka | 239—265.17 |
| 3,261,558 | 7/1966 | Davies | 239—602 X |
| 3,352,495 | 11/1967 | Fischer | 239—265.19 X |
| 3,353,356 | 11/1967 | Williams | 239—265.23 X |

EVERETT W. KIRBY, Primary Examiner

U.S. Cl X.R.

239—265.43, 546, 569, 602; 251—5